United States Patent [19]

Enami et al.

[11] Patent Number: 5,590,105
[45] Date of Patent: Dec. 31, 1996

[54] DISK APPARATUS USING CONSTANT LINEAR VELOCITY METHOD AND HAVING HEAD FUNCTION STOPPED IN STANDBY MODE

[75] Inventors: Katsuya Enami, Higashikurume; Tohru Miura, Chofu, both of Japan

[73] Assignee: TEAC Corporation, Japan

[21] Appl. No.: 404,638

[22] Filed: Mar. 15, 1995

[30] Foreign Application Priority Data

Mar. 30, 1994 [JP] Japan .................................. 6-061533

[51] Int. Cl.⁶ .................................................. G11B 7/00
[52] U.S. Cl. .............................. 369/50; 369/116; 369/57
[58] Field of Search ........................ 369/50, 32, 48, 369/116, 54, 58, 57, 124, 53

[56] References Cited

U.S. PATENT DOCUMENTS

| | | | |
|---|---|---|---|
| 4,623,939 | 11/1986 | Machida et al. | 369/50 |
| 4,723,235 | 2/1988 | Yasuda et al. | 369/50 |
| 4,766,502 | 8/1988 | Mashimo | 369/50 |
| 5,051,976 | 9/1991 | Kawano et al. | 369/50 |
| 5,243,587 | 9/1993 | Itoh et al. | 369/50 |
| 5,420,841 | 5/1995 | Hwang | 369/80 |
| 5,442,608 | 8/1995 | Umeda et al. | 369/50 |

*Primary Examiner*—Nabil Hindi
*Attorney, Agent, or Firm*—Andrus, Sceales, Starke & Sawall

[57] ABSTRACT

A disk apparatus using a CLV method is provided in which disk apparatus a power consumption is reduced by providing a power save mode in which an operation of a head driving system is stopped during a standby state. The disk apparatus uses a constant linear velocity method by which method a recording/reproducing operation of information on a disk is performed while the disk is rotated at a variable speed so that the linear velocity of the head relative to the disk is maintained to be constant. A disk driving unit rotates the disk, and a head driving unit drives the head. A linear velocity controlling unit controls a rotational speed of the disk so that the linear velocity of the head relative to the disk is maintained to be constant. A constant rotational speed controlling unit rotates the disk at a constant rotational speed. A switching unit switches a control of the disk driving unit to be performed by either one of the linear velocity controlling unit and the constant rotational speed controlling unit. A stopping unit stops an operation of the head driving unit while the disk driving unit is controlled by the constant rotational speed controlling unit.

8 Claims, 6 Drawing Sheets

DISK APPARATUS USING CONSTANT LINEAR VELOCITY METHOD AND HAVING HEAD FUNCTION STOPPED IN STANDBY MODE

BACKGROUND OF THE INVENTION

The present invention generally relates to disk apparatus, and more particularly to a disk apparatus in which a disk is rotated by using a constant linear velocity (CLV) method.

Optical disks are used in various fields because of their large memory capacity. Disk driving methods for optical disk apparatuses are classified, in general, into two methods; one is a constant linear velocity (CLV) method and the other is a constant angular velocity (CAV) method.

Whichever one of the above-mentioned methods an optical disk apparatus uses, the optical disk apparatus may be operated in any one of the following states:

1) all functions are inactive except for an interface for an external apparatus (inactive state);
2) a recording/reproducing operation is performed by operating a disk motor, a focusing device and a tracking servo device (active state); and
3) waiting for a command to be supplied for performing a recording/reproducing operation while the disk motor, the focusing device and the tracking servo device are in an active state (standby state).

The above-mentioned three states are switched by a controller in the optical disk apparatus. The three states are classified basically into two states; one state in which the optical disk apparatus is in an active state (states 2 and 3) and the other state in which the optical apparatus is in an inactive state (state 1). In the states, 2 or 3, in which the optical disk apparatus is active, all functions are activated, and thus a power consumption associated with the functions is large and a large amount of heat is generated. In particular, in the standby state 3, there is a problem in that a power is consumed wastefully and a large amount of heat is generated by the wasteful power consumption because the disk motor, the focusing device and the tracking servo device, which are not in actual use, are activated. Such a wasteful power consumption may be particularly a serious problem for a portable disk apparatus in which a battery is used.

Japanese Laid-Open Patent Applications No. 3-201261 and No. 4-76857 disclose disk apparatuses using a CAV method in which apparatuses the above-mentioned problems are eliminated. These disk apparatuses reduce a power consumption by stopping power supply to a head or stopping operations of a tracking servo circuit and a focusing servo, in turn, after a predetermined time elapses once the disk apparatuses fall into the standby state.

In a disk apparatus using the CAV method, since the disk is always rotated at a constant angular speed, a disk driving system and a head driving system can be controlled separately. Accordingly, in the disk apparatus using a CAV method, a power supply to the head driving system can be stopped in the standby state so that only a disk is rotated, thus reducing a power consumption. This is referred to as a power save mode.

On the other hand, in a disk apparatus using the CLV method, a rotational speed of a disk varies according to a position of a head, and thus a rotational speed of a spindle motor is controlled in accordance with positional information on the disk read out by the head. Due to this, a disk driving system and a head driving system cannot be controlled separately in the disk apparatus using the CLV method.

Accordingly, when a power save mode like that in the disk apparatus using the CAV method is introduced into a disk apparatus using the CLV method, an operation of a disk driving system must be stopped because a head driving system cannot be stopped separately from the disk driving system. Once the disk driving system is stopped, a rotation of the disk must be started up first to return to a regular operation mode from the power save mode. Accordingly, a long time is spent on returning from the power save mode to a regular operation mode, and thus there is a problem in that a response speed is slow making the above-mentioned method not practical for use.

SUMMARY OF THE INVENTION

It is a general object of the present invention to provide an improved and useful disk apparatus using a CLV method in which disk apparatus the above-mentioned problems are eliminated.

A more specific object of the present invention is to provide a disk apparatus using a CLV method in which disk apparatus a power consumption is reduced by providing a power save mode in which an operation of a head driving system is stopped during a standby state.

Another object of the present invention is to provide a disk apparatus using a CLV method, which disk apparatus can rapidly return to a regular operation mode from a power save mode by rotating a disk, during the power save mode, at a speed of the disk at a time the power save mode was set.

In order to achieve the above-mentioned objects, there is provided according to one aspect of the present invention, a disk apparatus using a constant linear velocity method by which method a recording/reproducing operation of information on a disk is performed while the disk is rotated at a variable speed so that the linear velocity of the head relative to the disk is maintained to be constant, the disk apparatus comprising:

a disk driving unit for rotating the disk;

a head driving unit for driving the head;

a linear velocity controlling unit for controlling a rotational speed of the disk so that the linear velocity of the head relative to the disk is maintained to be constant;

a constant rotational speed controlling unit for rotating the disk at a constant rotational speed;

a switching unit for switching a control of the disk driving unit to be performed by either one of the linear velocity controlling unit and the constant rotational speed controlling unit; and a stopping unit for stopping an operation of the head driving unit while the disk driving unit is controlled by the constant rotational speed controlling unit.

According to the present invention, since the constant rotational speed controlling unit is provided, when the operation of the head driving unit is stopped, the disk can be rotated at a constant rotational speed by the constant rotational speed controlling unit. Accordingly, a power save mode can be set in the disk apparatus using a CLV method, and thus a reduction in power consumption is achieved.

Other objects features and advantages of the present invention will become more apparent from the following detailed description when read in conjunction with the accompanying drawings.

DETAILED DESCRIPTION OF THE PREFERRED EMBODIMENT

Figure 1:
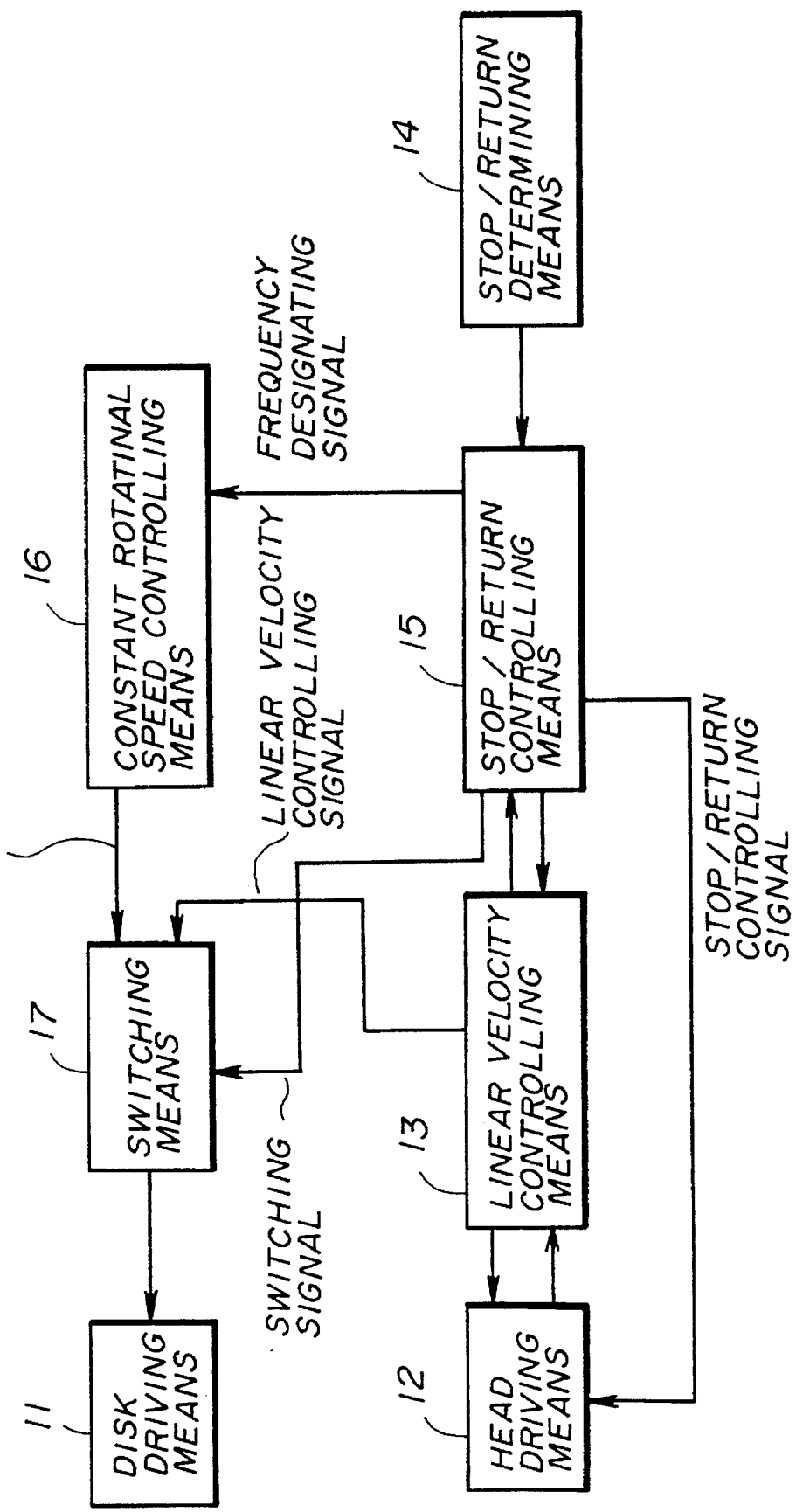
FIG. 1 is a block diagram showing a basic structure of the present invention.

A description will now be given, with reference to FIG. 1, of a basic structure of a disk apparatus according to the present invention which disk apparatus uses a CLV method.

The disk apparatus according to the present invention comprises disk driving means 11 for driving a disk and a head driving means 12 for driving a head. In FIG. 1, linear velocity controlling means 13 generates a linear velocity controlling signal used for rotating the disk at a constant linear velocity based on head position information supplied by the head driving means 12. The linear velocity controlling means 13 also controls an operation of the head driving means 12. The term "constant linear velocity" means that a relative speed of the head to the disk is constant. If the rotational speed of the disk is constant, the longer the distance between the head and the center of the disk, the larger the linear velocity. Accordingly, in order to achieve a constant linear velocity, a rotational speed of the disk must be varied according to a position of the head on the disk.

Stop/return determining means 14 determines whether or not a stop condition for stopping an operation of the head driving means 12 or a return condition for returning the head driving means 12 to an active state is established.

Stop/return controlling means 15 retains head position information at a time when an operation of the head driving means 12 is stopped, according to the determination made by the stop/return determining means 14, and also generates a frequency designating signal which designates a frequency of rotation of the disk.

Constant rotational speed controlling means 16 generates a constant rotational speed controlling signal for rotating the disk at a constant angular speed.

Switching means 17 switches paths for the constant rotational speed controlling signal supplied by the constant rotational speed controlling means 16 and the linear velocity controlling signal 13 supplied by the linear velocity controlling means in accordance with a switching signal supplied by the stop/return controlling means 15 so as to supply either one of the constant rotational speed controlling signal and the linear velocity controlling signal to the disk driving means 11.

In the above-mentioned structure, the stop/return controlling means 15 retains the head position information at the time when an operation of the head driving means is stopped, according to the determination made by the stop/return determining means 14, and also generates the frequency designating signal which designates a frequency of rotation of the disk and supplies it to the constant rotational speed controlling means 16. Additionally, the stop/return controlling means 15 supplies to the switching means 17 a first switching signal for selecting the constant rotational speed controlling signal, and also supplies to the head driving means 12 a stop controlling signal for stopping an operation of the head driving means 12. On the other hand, when returning the head driving means 12 to an active state, the stop/return controlling means 15 supplies to the head driving means 12 a return controlling signal for instructing a return of the head driving means 12 to an active state, and lets the linear velocity controlling means 13 control the position of the head according to the retained head position information, and also supplies to the switching means 17 a second switching signal for selecting the linear velocity controlling signal.

The stop/return determining means 14 determines that the stop condition is established when no command for operation has been supplied to the head driving means 12 from an external apparatus for a predetermined period.

As mentioned above, when the head driving means 12 is in operation, the linear velocity controlling means 13 is activated and the constant rotational speed controlling means 16 is not activated, while when the head driving means 12 is not in operation, the linear velocity controlling means 13 is not activated and the constant rotational speed controlling means 16 is activated.

Figure 2:
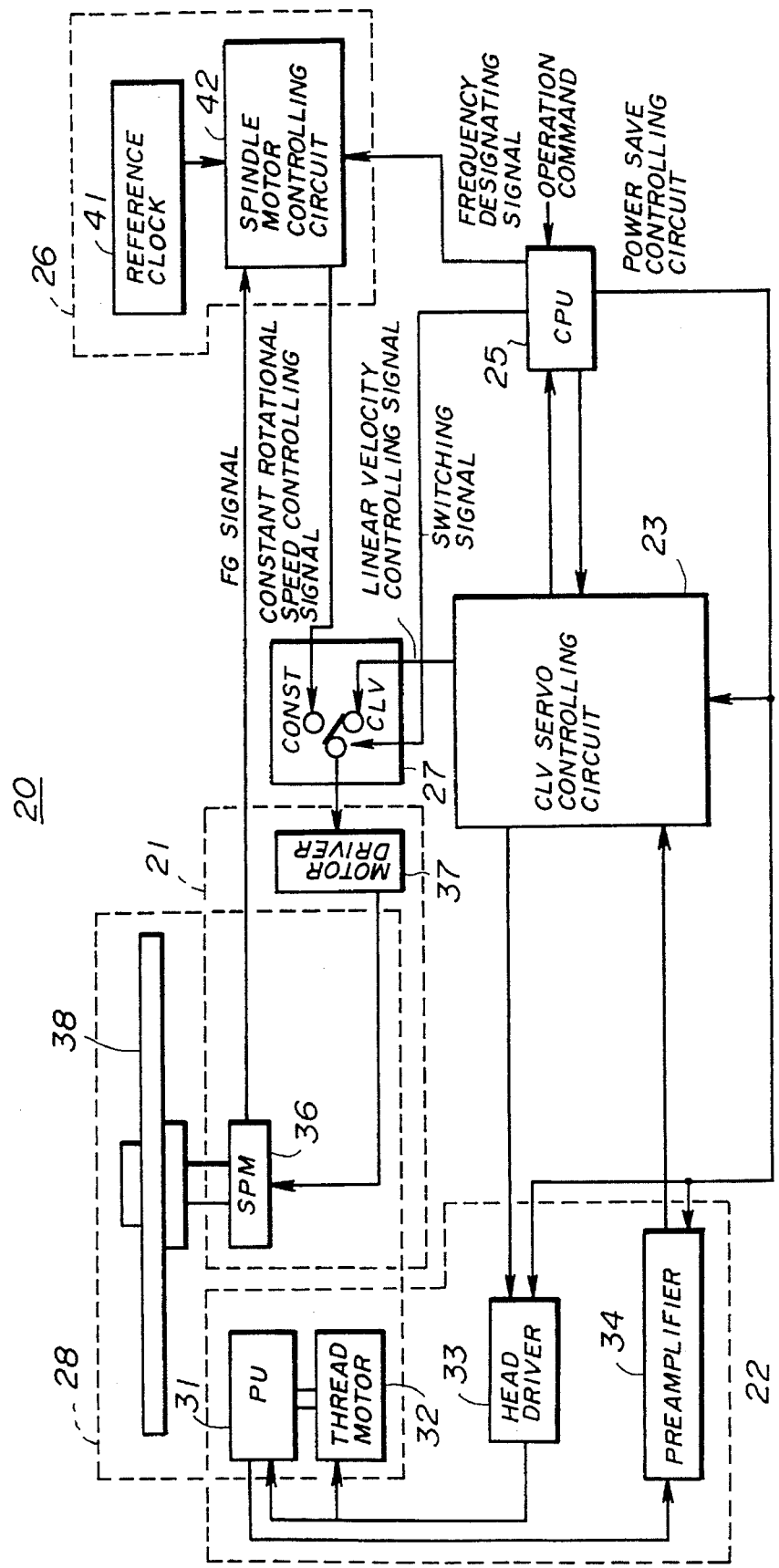
FIG. 2 is a block diagram of an embodiment of an optical disk apparatus according to the present invention.

A description will now be given, with reference to FIG. 2, of an embodiment of the present invention. FIG. 2 is a block diagram showing a structure of an optical disk apparatus 20 of an embodiment according to the present invention.

A head driving system 22, corresponding to the head driving means, comprises an optical pick-up (PU) 31 which corresponds to an optical head, a thread motor 32, a head driver 33 and a preamplifier 34. The thread motor 32 is a motor for moving the pick-up 31. Operations of the pick-up 31 and the thread motor 32 are controlled by the head driver 33. The preamplifier 34 is provided for processing a signal from the pick-up 31.

A disk driving system 21, corresponding to the disk driving means, comprises a spindle motor 36 and a motor driver 37. The spindle motor 36 drives an optical disk 38, and the motor driver 37 controls an operation of the spindle motor 36.

The head driving system 22 is connected to a CLV servo controlling circuit 23 corresponding to the linear velocity controlling means and to a central processing unit (CPU) 25. The disk driving system 21 is connected via a switching unit 27 corresponding to the switching means to a constant rotational speed controlling circuit 26 corresponding to the constant rotational speed controlling means and to the CLV servo controlling circuit 23. The constant rotational speed controlling circuit 26 comprises a reference clock circuit 41 and a spindle motor controlling circuit 42.

Functions of the stop/return determining means and the stop/return controlling means are achieved by a processing performed by the CPU 25 as described later.

The pick-up 31, the thread motor 32 and the spindle motor 36 constitutes a disk driving unit 28.

When the disk apparatus 20 is in a regular operation state, the head driving system 22 and the disk driving system 21 are controlled by the CLV servo controlling circuit 23. In order to achieve this, the switching unit 27 is switched to the CLV servo controlling circuit side in accordance with the switching signal supplied by the CPU 25 so that the linear velocity controlling signal is supplied to the disk driving system 21 from the CLV servo controlling unit 23.

The CLV servo controlling circuit 23 controls the head driver 33 and the motor driver 37 at the same time. The head driver 33 controls the thread motor 32 which drives the optical pick-up 31, a tracking coil of the pick-up 31 and a focusing coil of the pick-up 31. The head driver 33 controls a laser beam projected by the pick-up 31.

An information signal read out by the laser beam is processed by the preamplifier 34 and output from the head driving system 22. In this signal processing, positional information of the pick-up (head) is extracted, and supplied to the CLV servo controlling circuit 23. The CLV servo controlling circuit 23 generates the linear velocity controlling signal according to the positional information, and supplies it to the motor driver 37 via the switching unit 27. The motor driver 37 rotates the disk according to the linear velocity controlling signal so that the head is moved relative to the disk always at a constant linear velocity.

When the power save mode is set, the CPU 25 supplies the frequency designating signal for designating a rotation frequency of the disk 38 at the present position of the pick-up 31 in accordance with the positional information at the present time.

At this time, a switching signal for selecting the constant rotational speed controlling signal is supplied to the switching unit 27 from the CPU 25, and thereby a signal path in the switching unit 27 is switched from a CLV side to a CONST side via which the constant rotational speed controlling signal is supplied from the spindle motor controlling circuit 42. Accordingly, the disk driving system 21 can be controlled by the spindle motor controlling circuit 42.

The spindle motor controlling circuit 42 generates the constant rotational speed controlling signal in accordance with a reference clock signal, the frequency designating signal from the CPU 25 and an FG signal supplied by the spindle motor 36. The constant rotational speed controlling signal is supplied to the motor driver 37 via the switching unit 27. Thereby, in the power save mode, the spindle motor 36 is driven at a constant rotational speed by means of an FG servo control.

Additionally, in the power save mode, a power save controlling signal, corresponding to the stop controlling signal, is supplied from the CPU 25 to the head driver 33, the preamplifier 34 and the CLV servo controlling circuit 23. Accordingly, operations of the head driver 33, the preamplifier 34 and the CLV servo controlling circuit 23 are stopped, and the head driving system 22 and the CLV servo controlling circuit 23 are set in an inactive state in which only a very small amount of power is consumed.

Figure 3:
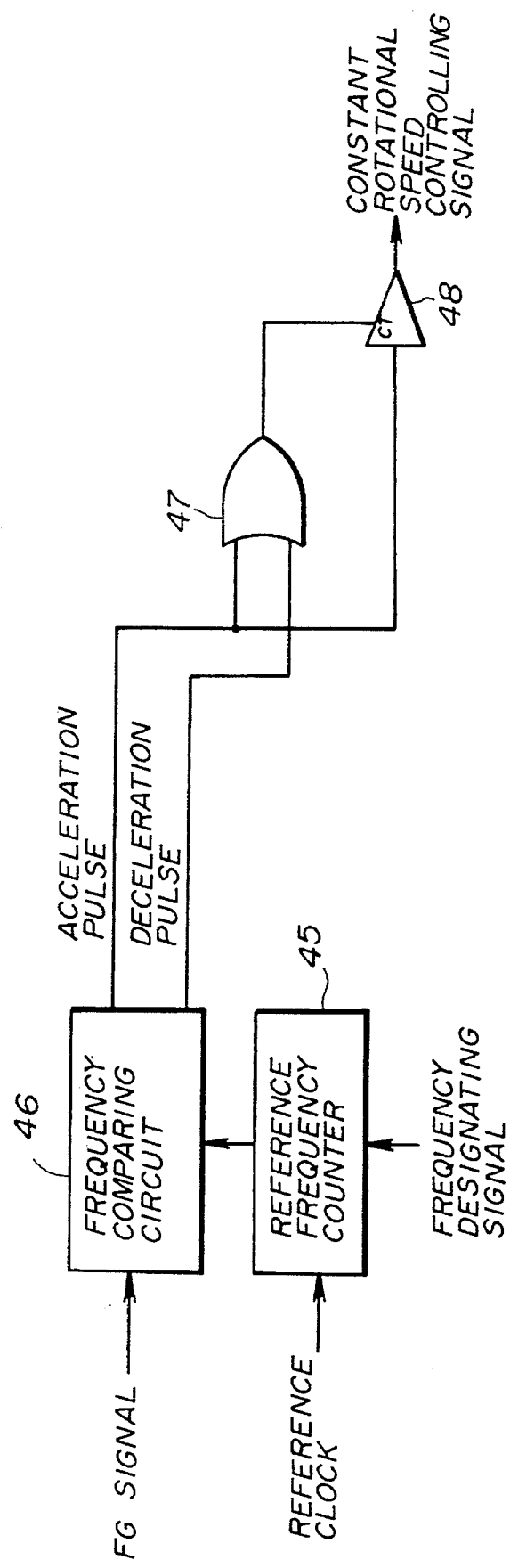
FIG. 3 is a block diagram showing a structure of a spindle motor controlling circuit shown in FIG. 2.

FIG. 3 is a block diagram showing a structure of the spindle motor controlling circuit 42. The spindle motor controlling circuit 42 comprises a reference frequency counter 45, a frequency comparing circuit 46, an OR circuit 47 and a three-state (3-ST) buffer 48.

Figure 4:
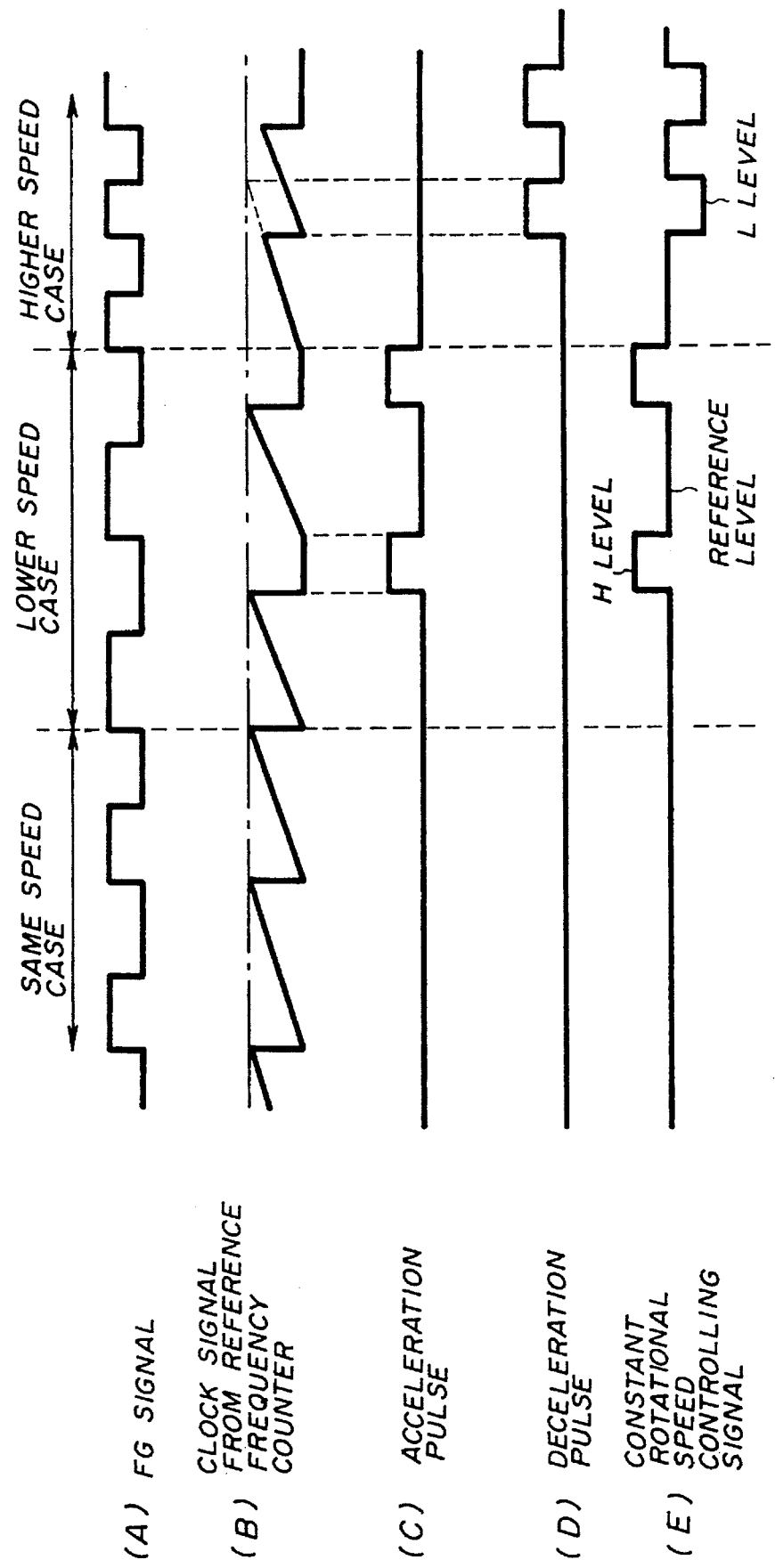
FIG. 4 is a time chart for explaining each signal in the spindle motor controlling circuit shown in FIG. 3.

FIG. 4 is a time chart of each signal in the spindle motor controlling circuit 42. The reference frequency counter 45 generates a clock signal having a frequency designated by the frequency designating signal in accordance with the reference clock signal supplied by the reference clock circuit 41 and the frequency designating signal supplied by the CPU 25, and supplies the generated clock signal to the frequency comparing circuit 46.

The frequency comparing circuit 46 compares the clock signal (FIG. 4-(B))output from the reference frequency counter 45 with the FG signal (FIG. 4-(A)) from the spindle motor 36. By this comparison, if it is determined that the rotational speed of the spindle motor 36 is lower than the speed corresponding to the frequency designating signal, an acceleration pulse (FIG. 4-(C)) is generated for each period of the FG signal. A width of the acceleration pulse corresponds to a difference between a period of the clock signal supplied by the reference clock counter 45 and a period of the FG signal. If it is determined that the rotational speed of the spindle motor 36 is higher than the speed corresponding to the frequency designating signal, a deceleration pulse (FIG. 4-(D)) is generated for each period of the FG signal. A width of the deceleration pulse corresponds to a difference between a period of the clock signal supplied by the reference clock counter 45 and a period of the FG signal. If it is determined that the rotational speed of the spindle motor 36 is equal to the speed corresponding to the frequency designating signal, neither the acceleration pulse nor the deceleration pulse is generated.

It should be noted that the clock signal output from the reference frequency counter 45 is illustrated so that the difference between the period of the clock signal and the period of the FG signal can be clearly indicated.

The acceleration pulse is supplied to an input terminal of the 3-ST buffer 48 and one of input terminals of the OR circuit 47. The deceleration pulse is supplied to the other input terminal of the OR circuit 47. An output of the OR circuit 47 is supplied to a control terminal CT of the 3-ST buffer 48.

When the control terminal CT of the 3-ST buffer 48 is at a low (L) level, the 3-ST buffer 48 is in a high impedance state, and thus a level of an output signal from the 3-ST buffer 48 is at a reference level which is in the middle between a high (H) level and a low (L) level.

When the control terminal CT is at a high (H) level, the 3-ST buffer 48 functions as a buffer so as to output a signal having the same level with the input signal.

Accordingly, when neither the acceleration pulse or the deceleration pulse is generated as shown in FIG. 4-(E), the constant rotational speed controlling signal output from the 3-ST buffer 48 is at the reference level; if the acceleration pulse is generated, the constant rotational speed controlling signal is at the H level for acceleration; if the deceleration pulse is generated, the constant rotational speed controlling signal is at the L level for deceleration.

The constant rotational speed controlling signal is supplied to the motor driver 37 via the switching unit 27 so that the disk 38 is rotated at a constant speed corresponding to the frequency designating signal.

Figure 5:
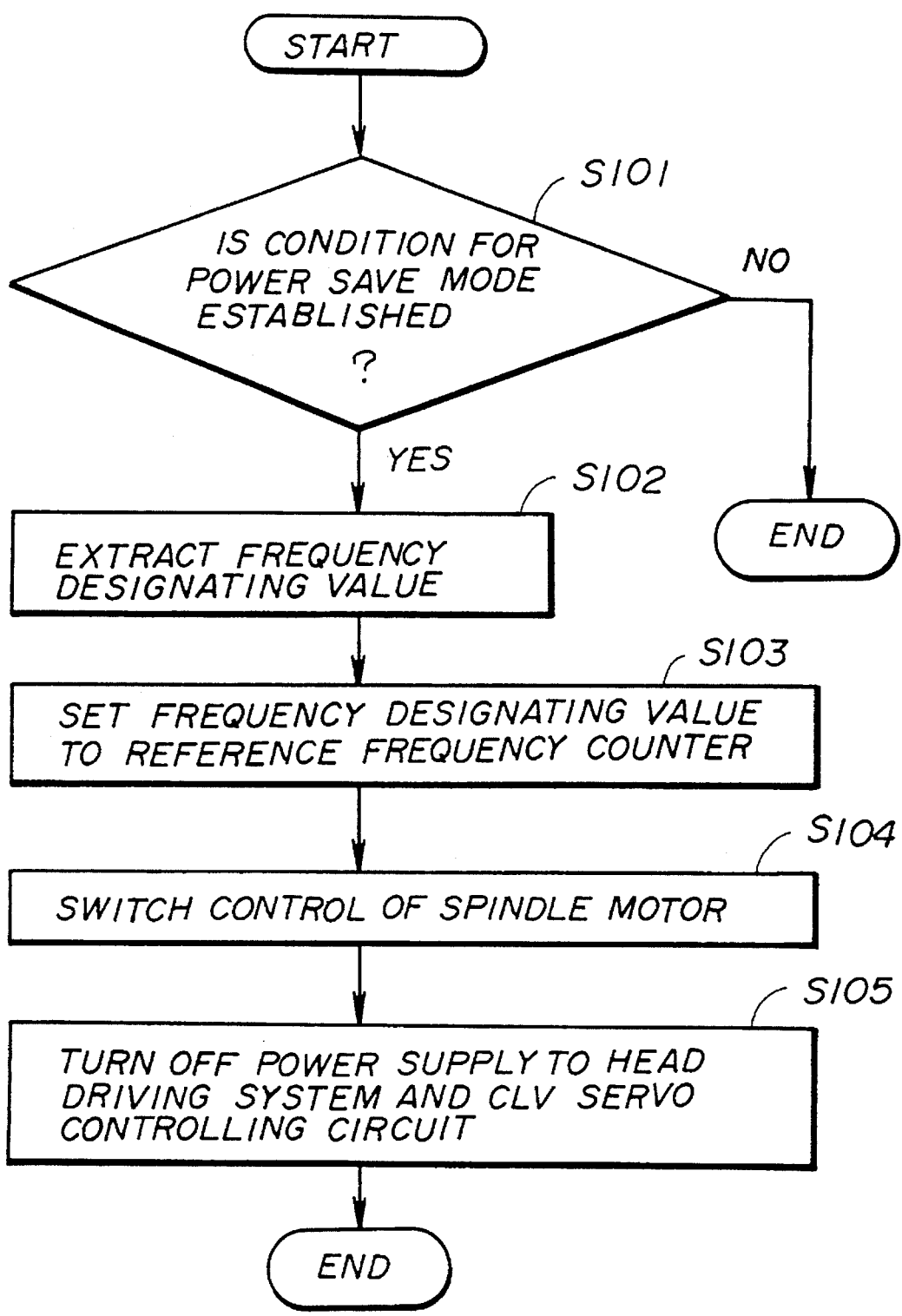
FIG. 5 is a flowchart showing a process for shifting from a regular operation mode to a power save mode.

A description will now be given of an operation performed when a regular operation mode is switched to the power save mode. FIG. 5 is a flowchart showing a process performed by the CPU 25 when the regular operation mode is switched to the power save mode. In FIG. 5, step 101 corresponds to the function of the stop/return determining means, and steps from 102 to 105 correspond to a stopping operation of the stop/return controlling means.

In an operation according to the regular operation mode, it is determined, in step 101, whether or not a condition for switching to the power save mode is established. For example, when no command for operation has been supplied to the disk apparatus 20 from an external apparatus for a predetermined period, or a command requiring the power save mode is input from an external apparatus, it is determined that the condition for switching to the power save mode is established.

If it is determined that the condition for the power save mode is not established, the routine ends to continue an operation in the regular operation mode.

If it is determined that the condition for the power save mode is established, steps 102 to 105 are executed to switch to the power save mode. In step 102, positional information of the pick-up 31 is read from the CLV servo controlling circuit 23, and a rotational frequency of the disk 38 at the present position of the pick-up 38 is extracted, as a frequency designating value, from the positional information. It should be noted that this positional information is retained for positional information used when the power save mode is returned to the regular operation mode.

In step 103, the frequency designating signal corresponding to the extracted frequency designating value is supplied to the reference frequency counter 45 of the spindle motor controlling circuit 42. Thereby, the frequency designating value is set in the reference frequency counter 45.

In step 104, the switching unit 27 is switched to the CONST side by supplying to the switching unit 27 a switching signal for switching to the CONST side. Accordingly, the disk 38 is rotated at a constant rotational speed corresponding to the frequency designated by the frequency designating value according to the constant rotational speed controlling signal from the spindle motor controlling circuit 42.

In step 105, the CPU 25 stops power supply to the head driver 33 and preamplifier 34 of the head driving system 22 and the CLV servo controlling circuit 23 by supplying a power save controlling signal representing stopping of the operation to the head driver 33, preamplifier 34 and the CLV servo controlling circuit 23.

By the above-mentioned manner, the disk apparatus 20 is set to the power save mode. In the power save mode, a power consumption of the head driving system 22 is very low. Additionally, the disk 38 is rotated at a constant rotational speed corresponding to the position of the pick-up 31 at the time when an operation mode is switched to the power save mode.

Figure 6:
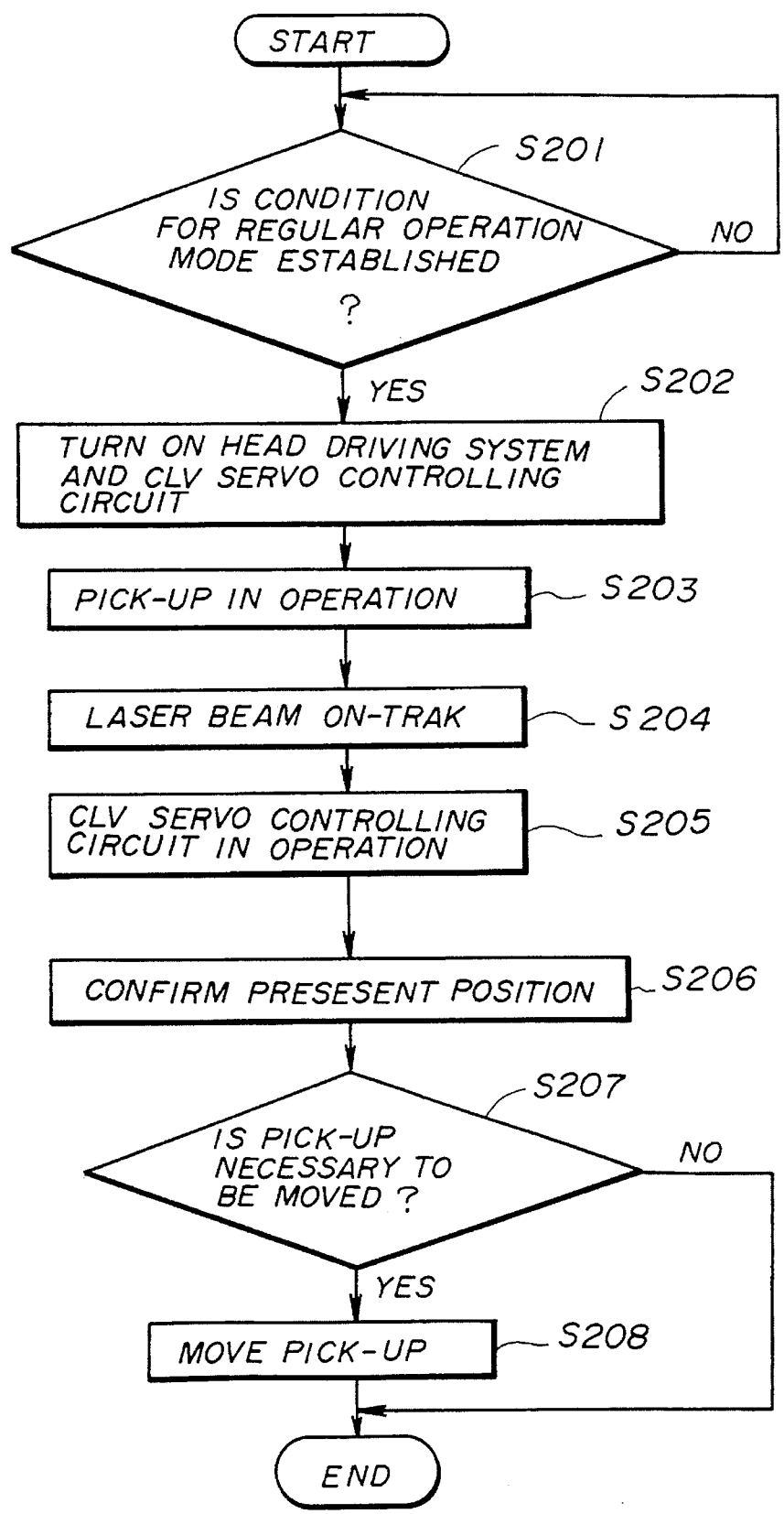
FIG. 6 is a flowchart showing a process returning from the power save mode to the regular operation mode.

A description will now be given of an operation performed when the power save mode is switched to a regular operation mode. FIG. 6 is a flow chart showing a process performed by the CPU 25 when the power save mode is switched to the regular operation mode. In FIG. 6, step 201 corresponds to the function of the stop/return determining means, and steps from 202 to 208 correspond to a returning operation of the stop/return controlling means.

In an operation according to the power save mode, it is determined, in step 201, whether or not a condition for switching to the regular operation mode is established. For example, when a command requiring the regular operation mode is input from an external apparatus, it is determined that the condition for switching to the regular operation mode is established.

If it is determined that the condition for the regular operation mode is not established, the routine ends to continue an operation in the power save mode. It should be noted that when a power of the disk apparatus 20 is turned off, the power save mode is canceled.

If it is determined that the condition for regular operation mode is established, steps 202 to 208 are executed to switch to the regular operation mode. In step 202, the CPU 25 turns on the power supply to the head driver 33 and preamplifier 34 of the head driving system 22 and the CLV servo controlling circuit 23 by supplying a power save controlling signal representing returning to the regular operation to the head driver 33, preamplifier 34 and the CLV servo controlling circuit 23.

In step 203, the focusing servo and tracking servo of the pick-up 31 are activated by the CLV servo controlling circuit 23.

In step 204, the laser beam projected from the pick-up 31 is on-tracked. Thereafter, the switching unit 27 is switched, in step 205, to the CLV side by supplying to the switching unit 27 a switching signal for switching to the CLV side. Accordingly, the rotation of the disk 38 is controlled by the linear velocity controlling signal from the CLV servo controlling circuit 23.

In step 206, the present positional information (including address information, track information and sector information) of the pick-up 31 is read, and the present positional information is compared with the positional information at the time the power save mode was set.

In step 207, it is determined whether or not the pick-up 31 must be moved. When the above-mentioned two sets of positional information match, or when a difference between the two sets of positional information is within a rocking range of the pick-up 31, it is determined that the pick-up 31 is not necessary to be moved, and then the routine is ended to return to the regular operation mode.

On the other hand, if it is determined that the pick-up 31 must be moved because the difference between the two sets of positional information is large, the pick-up 31 is moved, in step 208, to the previous position according to the positional information obtained when the power save mode was set.

It should be noted that when the difference is large, the pick-up 31 is to be moved to the previous position when the power save mode was set after a pull-in of the CLV servo controlling circuit 23 is performed so as to confirm the present position of the pick-up 31.

As mentioned above, since the constant rotational speed controlling circuit 26 is provided in the present embodiment, when the operation of the head driving system 22 is stopped, the disk 38 is rotated at a constant rotational speed by the constant rotational speed controlling circuit 26. Accordingly, the power save mode can be set in the disk apparatus using a CLV method, and thus a reduction in power consumption is achieved.

Additionally, since the disk 38 is rotated in the power save mode at a frequency corresponding to the position of the pick-up 31 when the power save mode was set, the operation can be rapidly returned to the regular operation mode.

It should be noted that although, when switched to the power save mode, the operations of the head driving system 22 and the CLV servo controlling circuit 23 are stopped at the same time after the control of the disk apparatus 38 is switched from the CLV servo controlling circuit 23 to the spindle motor controlling circuit 42, the tracking servo function, the focusing servo function and the pick-up driving function may be stopped, in turn, at a predetermined time interval so as to stop finally the entire function of the head driving system 22. In this case, since the functions of the head driving system 22 are not stopped at the same time, when a command requesting returning to the regular operation mode is input during the switching process to the power save mode, a time for returning to the regular operation mode can be reduced.

The present invention is not limited to the specifically disclosed embodiments, and variations and modifications may be made without departing from the scope of the present invention.

What is claimed is:

1. A disk apparatus using a constant linear velocity method by which method a recording/reproducing operation of information on a disk is performed while the disk is rotated at a variable speed so that the linear velocity of a head relative to the disk is maintained constant, the disk apparatus comprising:

disk driving means for rotating said disk;

head driving means for driving said head;

linear velocity controlling means for controlling a rotational speed of said disk so that the linear velocity of said head relative to said disk is maintained constant;

constant rotational speed controlling means for rotating said disk at a constant rotational speed;

switching means for switching control of said disk driving means so as to be performed by either one of said linear velocity controlling means and said constant rotational speed controlling means, the control of said disk driving means being switched to said linear velocity controlling means in a state in which the recording/reproducing operation is performed by said head, the control of said disk driving means being switched to said constant rotational speed controlling means in a state in which the recording/reproducing operation is not performed by said head; and stopping means for stopping an operation of said head driving means while said disk driving means is controlled by said constant rotational speed controlling means.

2. The disk apparatus as claimed in claim 1, wherein said constant rotational speed of said disk is set to a speed obtained at a time when the control of said disk driving means is switched to said constant rotational speed controlling means.

3. The disk apparatus as claimed in claim 1, wherein said switching means switches the control of said disk driving means to said constant rotational speed controlling means when a recording/reproducing operation by said head is not performed for a predetermined period of time.

4. The disk apparatus as claimed in claim 1, wherein when the control of said disk driving means is switched to said linear velocity controlling means, said head is moved to a position at which said head was positioned when the control of said disk driving means was switched previously to said constant rotational speed controlling means.

5. A disk apparatus using a constant linear velocity method by which method a recording/reproducing operation of information on a disk is performed while the disk is rotated at a variable speed so that the linear velocity of a head relative to the disk is maintained constant, the disk apparatus comprising:

disk driving means for rotating said disk;

head driving means for driving said head;

linear velocity controlling signal for controlling a rotational speed of said disk so that the linear velocity of said head relative to said disk is maintained constant, and for controlling an operation of said head driving means;

constant rotational speed controlling means for generating a constant rotational speed controlling signal for rotating said disk at a constant rotational speed in accordance with a frequency designating signal which designates a frequency of rotation of said disk; and stop/return determining means for determining whether or not either one of a stop condition for stopping an operation of said head driving means and a return condition for returning said head driving means to an active state is established;

stop/return controlling means, when it is determined by said stop/return determining means that the stop condition is established, for retaining current head position information, generating the frequency designating signal and supplying the frequency designating signal to said constant rotational speed controlling means, generating a first switching signal for selecting the constant rotational speed controlling signal, and supplying to said head driving means a stop controlling signal for stopping an operation of said head driving means, said stop/return controlling means, when it is determined that the return condition is established, supplying to said head driving means a return controlling signal for instructing a return of said head driving means to an active state, causing said linear velocity controlling means to control a positioning of said head according to the head position information retained in said stop/return controlling means, and generating a second switching signal for selecting the linear velocity controlling signal; and switching means for switching paths for the constant rotational speed controlling signal supplied by said constant rotational speed controlling means and the linear velocity controlling signal supplied by said linear velocity controlling means in accordance with one of the first switching signal and the second switching signal supplied by the stop/return controlling means so as to supply either one of the constant rotational speed controlling signal and the linear velocity controlling signal to said disk driving means.

6. The disk apparatus as claimed in claim 5, wherein said stop/return determining means determines that the stop condition is established when a command for requesting the operation of said head driving means is not supplied for a predetermined period of time.

7. The disk apparatus as claimed in claim 5, wherein said head driving means has a plurality of functions related to an operation of said head, and at least one of the functions is stopped when the stop controlling signal is supplied to said head driving means.

8. The disk apparatus as claimed in claim 5, wherein said head driving means has a plurality of functions related to an operation of said head, and each function is stopped sequentially at a predetermined time interval when the stop controlling signal is supplied to said head driving means.

* * * * *